United States Patent
Sato et al.

(10) Patent No.: US 9,684,099 B2
(45) Date of Patent: Jun. 20, 2017

(54) FLEXIBLE DISPLAY DEVICE

(71) Applicant: LG DISPLAY CO., LTD., Seoul (KR)

(72) Inventors: Osamu Sato, Tokyo (JP); Kazuhiko Tamai, Tokyo (JP); Dong-Uk Cho, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/877,576

(22) Filed: Oct. 7, 2015

(65) Prior Publication Data
US 2016/0103249 A1    Apr. 14, 2016

(30) Foreign Application Priority Data
Oct. 9, 2014   (JP) .................................. 2014-207796

(51) Int. Cl.
*G02B 1/111* (2015.01)
*B32B 27/14* (2006.01)

(52) U.S. Cl.
CPC .............. *G02B 1/111* (2013.01); *B32B 27/14* (2013.01); *B32B 2264/102* (2013.01); *B32B 2264/12* (2013.01); *B32B 2307/412* (2013.01); *B32B 2457/202* (2013.01)

(58) Field of Classification Search
CPC ....... B32B 5/16; B32B 7/02; B32B 2264/102; C08K 3/36; G02B 1/11; G02B 1/115; Y10T 428/254; Y10T 428/265; Y10T 428/249981
See application file for complete search history.

(56) References Cited

U.S. PATENT DOCUMENTS

| | | | | |
|---|---|---|---|---|
| 6,383,559 B1* | 5/2002 | Nakamura | ................ | B32B 7/02 |
| | | | | 359/609 |
| 2006/0099407 A1* | 5/2006 | Wang | .................... | B82Y 20/00 |
| | | | | 428/323 |
| 2010/0118406 A1* | 5/2010 | Kobori | .................... | G02B 1/111 |
| | | | | 359/580 |
| 2014/0153099 A1* | 6/2014 | Ogane | .................. | G02B 5/0247 |
| | | | | 359/601 |

FOREIGN PATENT DOCUMENTS

| JP | 2004-258394 A | 9/2004 |
|---|---|---|
| JP | 2005-338549 A | 12/2005 |

* cited by examiner

*Primary Examiner* — Hai Vo
(74) *Attorney, Agent, or Firm* — Dentons US LLP

(57) ABSTRACT

A flexible display device includes an antireflective film on an image display surface of the flexible display device, wherein the antireflective film includes an antireflective layer disposed on at least one surface of a transparent resin film having flexibility and including inorganic particles and matrix resin, wherein a volumetric ratio of the inorganic particles in the antireflective layer is equal to or larger than 40 vol %, wherein a diameter of each of the inorganic particles is within a range of 5 to 200 nm, wherein a thickness of the antireflective layer is within a range of 50 to 200 nm, and wherein there is no crack when a bending test of the antireflective film is performed based on JIS K 5600-5-1 and using a cylindrical mandrel with a diameter of 2 mm.

5 Claims, 1 Drawing Sheet

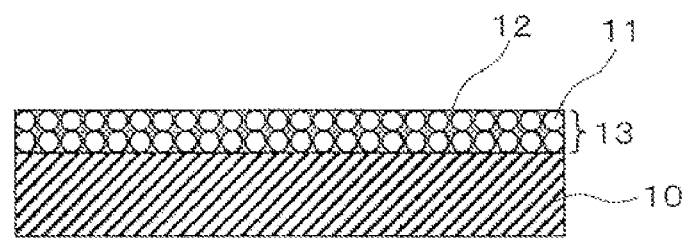

FLEXIBLE DISPLAY DEVICE

CROSS-REFERENCE TO RELATED APPLICATIONS

The present application claims the benefit of Japanese Patent Application No. 2014-207796 filed in Japan on Oct. 9, 2014, which is incorporated by reference in its entirety for all purposes as if fully set forth herein.

BACKGROUND

Field of the Disclosure

The present disclosure relates to a flexible display device.

Discussion of the Related Art

Recently, a flexible display device has been suggested which uses a resin substrate having flexibility rather than a glass substrate which has been widely used for a display device such as a liquid crystal display device or an EL display device. An antireflective film having an antireflective layer (low refractive index layer) is disposed on an image display surface of the display device to prevent an external light such as a fluorescent tube from being reflected and to improve visibility. The antireflective layer needs flex resistance as well as high antireflection and transparency.

To fabricate an antireflective film, the following technologies have been known: a technology of forming a low refractive index layer of a silica film on a surface of a film by a plasma CVD method (referred to as "Patent document 1" of Japanese Patent Publication No. 2004-258394, for example); and a technology of forming a low refractive index layer by using forming an adjacent layer including silicone oil or silicone surfactant on a film, applying and drying a coating solution including a low refractive index material on the adjacent layer, and then curing the coating solution (referred to as "Patent document 2" of Japanese Patent Publication No. 2005-338549).

However, in the technology of the Patent document 1, there is a problem that initial costs increase and productivity is low because plasma CVD equipment needs to be newly introduced to form the low refractive index layer of silica film. Moreover, in the Patent document 1, although it is disclosed that a hard coating layer of thermosetting resin or inonizing radiation-curable resin can be formed between the film and the low refractive index layer, when the hard coating layer is formed, there is another problem that scratch resistance increases but folding endurance is considerably lowered. Meanwhile, in the technology of the Patent document 2, since a process of forming a plurality of layers is necessary, there are problems that the productivity is low, costs are raised, and the transparency of the obtained antireflective film is not enough. As stated above, the antireflective film according to the related art is not satisfactory for the flexible display device.

SUMMARY OF THE INVENTION

Accordingly, the present invention is directed to a flexible display device that substantially obviates one or more of the problems due to limitations and disadvantages of the related art.

An object of the present invention is to provide a flexible display device that includes an antireflective film increasing productivity at low costs and having superior folding endurance, scratch resistance and transparency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described herein, the present invention provides a flexible display device includes an antireflective film on an image display surface of the flexible display device, wherein the antireflective film includes an antireflective layer disposed on at least one surface of a transparent resin film having flexibility and including inorganic particles and matrix resin, wherein a volumetric ratio of the inorganic particles in the antireflective layer is equal to or larger than 40 vol %, wherein a diameter of each of the inorganic particles is within a range of 5 to 200 nm, wherein a thickness of the antireflective layer is within a range of 50 to 200 nm, and wherein there is no crack when a bending test of the antireflective film is performed based on JIS K 5600-5-1 and using a cylindrical mandrel with a diameter of 2 mm.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide a further understanding of the invention and IS incorporated in and constitutes a part of this specification, illustrates embodiments of the invention and together with the description serve to explain the principles of the invention.

The FIGURE is a schematic cross-sectional view illustrating an antireflective film disposed on an image display surface of a flexible display device according to an exemplary embodiment of the present invention.

DETAILED DESCRIPTION OF THE PREFERRED EMBODIMENTS

Reference will now be made in detail to the preferred embodiments, examples of which are illustrated in the accompanying drawings.

Exemplary Embodiment

The FIGURE is a schematic cross-sectional view illustrating an antireflective film disposed on an image display surface of a flexible display device according to an exemplary embodiment of the present invention. The flexible display device may be one of a flexible liquid crystal display device, a flexible organic EL display device, and so on where display elements are formed on a flexible resin substrate and is not limited to these.

As shown in the FIGURE, the antireflective film according to the exemplary embodiment of the present invention includes a transparent resin film 10 having flexibility and an antireflective layer 13 formed on a surface of the transparent resin film 10. The antireflective layer 13 includes inorganic particles 11 and matrix resin 12.

A thickness of the antireflective layer 13 may be within a range of 50 nm to 200 nm, and beneficially, may be within a range of 90 nm to 200 nm. If the thickness of the antireflective layer 13 is smaller than 50 nm or larger than 200 nm, it is not possible to obtain an antireflective effect against visible ray.

The volumetric ratio of the inorganic particles 11 in the antireflective layer 13 may be equal to or larger than 40 vol %, and beneficially, may be within a range of 50 vol % to 74 vol %. If the volumetric ratio of the inorganic particles 11 is smaller than 40 vol %, the matrix resin 12 may excessively exist between the inorganic particles 11, and the antireflective layer 13 may easily crack when a substrate is bent. Therefore, the folding endurance cannot be obtained.

A diameter of each inorganic particle 11 included in the antireflective layer 13 may be within a range of 5 nm to 200 nm, and beneficially, may be within a range of 50 nm to 100 nm. If the diameter of each inorganic particle 11 is smaller than 50 nm, the thickness of the antireflective layer 13 cannot be equal to or larger than 100 nm even if the inorganic particles 11 are layered as two layers in a thickness direction of the antireflective layer 13. On the other hand, if the diameter of each inorganic particle 11 is larger than 200 nm, the thickness of the antireflective layer 13 cannot be equal to or smaller than 200 nm.

A method of forming the antireflective layer 13 is not particularly limited, and beneficially, may be a coating method in which a coating solution including the inorganic particles 11, the matrix resin and a solvent (as occasion demands) is applied and then cured. The coating method may be one of a spin coating method, a slit coating method, a roll coating method, an inkjet method, and so on. The inorganic particles 11 are not particularly limited as long as their diameters satisfy the above-mentioned range and are selected from silica particles, alumina particles, zinc oxide particles, and so on. Among these, it is beneficial to select silica particles, and it is more beneficial to select hollow silica particles in view of low refractive index, transparency and hardness. In addition, the matrix resin 12 may be properly selected from thermosetting resin and UV curable resin. The coating solution may be goods on the market such as ELCOM P-5062 of JGC Catalysts and Chemicals Ltd., for example.

A publicly-known film used for an antireflective film may be used as the transparent resin film 10 having flexibility without any restriction, and the transparent resin film 10 having flexibility may include at least one of polyethylene terephthalate (PET), poly methyl methacrylate (PMMA), polycarbonate, polystyrene, and so on, for example. A thickness of the transparent resin film 10 having flexibility may be within a range of 10 micrometers to 1000 micrometers.

It is required for the antireflective film that the antireflective layer 13 does not crack when a surface of the antireflective layer 13 is seen with the naked eye after a bending test based on JIS (Japanese Industrial Standard) K 5600-5-1 and using a cylindrical mandrel with a diameter of 2 mm.

The antireflective layer 13 of the antireflective film, beneficially, has hardness equal to or more than H in a pencil hardness test (weight 1000 g) based on JIS K 5600-5-4. The hardness of the antireflective layer 13 may be improved by controlling a kind of the matrix resin 12, a sort of the inorganic particles 11, and the volumetric ratio of the inorganic particle 11. Moreover, the antireflective layer 13 of the antireflective film, beneficially, has a refractive index smaller than 1.45 when it is measured at a wavelength of 550 nm. The refractive index of the antireflective layer 13 can be changed by controlling the sort of the inorganic particles 11 and the volumetric ratio of the inorganic particles 11.

The antireflective film according to the exemplary embodiment of the present invention lowers initial costs and increases productivity because it does not need the introduction of new plasma CVD equipment and is able to be fabricated using the existing equipment such as a bar coater. In addition, the antireflective film has high antireflective properties and is superior in folding endurance, scratch resistance and transparency. Especially, when a hollow silica particle is used as the inorganic particles 11 and polyethylene terephthalate is used as the transparent resin film 10 having flexibility, the antireflective film has the reflectance of 5% to 6% and total light transmittance (total transmittance) of 88% to 91% and has favorable antireflective properties and transparency. Therefore, the antireflective film is useful in a flexible display device.

Moreover, in the FIGURE, although the antireflective layer 13 includes the inorganic particles 11 of two layers in its thickness direction as the exemplary embodiment, the inorganic particles 11 may be one layer or may be three layers or more if the above-mentioned conditions are satisfied. Furthermore, a hard coating layer may be further formed between the transparent resin film 10 and the antireflective layer 13.

Hereinafter, the present invention is described in detail by an embodiment and comparative examples but is not limited to these.

Embodiment 1

A coating solution (ELCOM P-5062 of JGC Catalysts and Chemicals Ltd.) including hollow silica particles (diameter of 65 nm) and matrix resin was applied on a PET film on the market (COSMOSHINE (registered trademark) A4300 of TOYOBO Co., LTD., thickness of 100 micrometers) using a bar coater. After that, the coating solution was dried on a hot plate at 80° C. for 2 minutes and cured by irradiating UV (400 mJ/cm2, wavelength of 365 nm) in nitrogen atmosphere, thereby obtaining an antireflective film.

The folding endurance, scratch resistance and reflectance of the antireflective film were evaluated by the following methods. The results are shown in Table 1.

Evaluation of Folding Endurance

The radius of curvature of a sample was measured based on JIS K 5600-5-1 and using a cylindrical mandrel tester (model 266 of ERICHSEN). The sample was inserted in a specimen mount such that a surface of an antireflective layer of the sample became an outer side or inner side of the cylindrical mandrel and a bending test is performed. After that, it was ascertained with the naked eye whether there were scratches and cracks on the surface of the antireflective layer or not. In a case that there were no scratches and cracks, another test was carried out using a cylindrical mandrel with a smaller diameter than before. A radius of the minimum cylindrical mandrel in a case without scratches and cracks was determined as the radius of curvature of the sample in each of outer bending and inner bending. Here, the smaller the radius of curvature is, the more excellent the folding endurance is.

Evaluation of Scratch Resistance

Pencil hardness of the sample was measured based on JIS K 5600-5-4 and using a reciprocating friction tester (TYPE 30 of Shinto Scientific Co., Ltd.). A pencil was set with an inclined angle of 45 degrees with respect to a surface of the sample, and the surface of the sample was made reciprocating under conditions with weight of 1000 g, a stage speed of 300 mm/minute, and a moving distance of 50 mm. After that, it was ascertained with the naked eye whether there were scratches on the surface of the sample or not. Three tests were performed at the same pencil hardness, and in a case that there were no scratches all three times, another three tests were carried out at higher pencil hardness than before. A maximum hardness in a case without scratches all three times was determined as the pencil hardness of the sample. Here, the higher the pencil hardness is, the more excellent the scratch resistance is.

Evaluation of Reflectance

The reflectance of the sample was measured using a spectrophotometer (CM-2600d of Konica Minolta, Inc.). The reflectance is an average value of three total reflection rate data measured such that a coating surface faced the upper side.

Comparative Example 1

The folding endurance, scratch resistance and reflectance of a PET film on the market (COSMOSHINE (registered trademark) A4300 of TOYOBO Co., LTD., thickness of 100 micrometers) were evaluated by the same methods as the embodiment 1. The results are shown in Table 1.

Comparative Example 2

A UV curable hard coating agent of TUFTOP (registered trademark) SHO (TORAY INDUSTRIES, INC.) was applied on a PET film on the market (COSMOSHINE (registered trademark) A4300 of TOYOBO Co., LTD., thickness of 100 micrometers) using a bar coater to thereby form a layer. A thickness of the layer was about 20 micrometers. The folding endurance, scratch resistance and reflectance of the obtained PET film including the layer thereon were evaluated by the same methods as the embodiment 1. The results are shown in Table 1

Comparative Example 3

A UV curable hard coating agent of DEFENSA (registered trademark) FH-700 (DIC Corporation) was applied on a PET film on the market (COSMOSHINE (registered trademark) A4300 of TOYOBO Co., LTD., thickness of 100 micrometers) using a bar coater to thereby form a layer. A thickness of the layer was about 20 micrometers. The folding endurance, scratch resistance and reflectance of the obtained PET film including the layer thereon were evaluated by the same methods as the embodiment 1. The results are shown in Table 1

Comparative Example 4

A scratch self-healing paint PLANET (registered trademark) TC Clear CF100 (Origin ELECTRIC CO., LTD.) FH-700 (DIC Corporation) was applied on a PET film on the market (COSMOSHINE (registered trademark) A4300 of TOYOBO Co., LTD., thickness of 100 micrometers) using a bar coater to thereby form a layer. A thickness of the layer was about 20 micrometers. The folding endurance, scratch resistance and reflectance of the obtained PET film including the layer thereon were evaluated by the same methods as the embodiment 1. The results are shown in Table 1

TABLE 1

|  | radius of curvature (mm) | pencil hardness | reflectance (%) |
| --- | --- | --- | --- |
| Embodiment 1 | 2 | H | 6 |
| Comparative example 1 | 2 | HB | 9 |
| Comparative example 2 | 12 | 3H | 8 |
| Comparative example 3 | 12 | 2H | 8 |
| Comparative example 4 | 2 | HB~F | 8 |

Here, the radius of curvature of Table 1 was the radius of the minimum cylindrical mandrel of the case without scratches and cracks in the evaluation method disclosed in <evaluation of folding endurance>. In addition, the pencil hardness of Table 1 was the maximum pencil hardness of the case without scratches all three times in the evaluation method disclosed in <evaluation of scratch resistance>.

Based upon the results, all the antireflective films obtained from comparative examples 2, 3 and 4 did not decrease enough the reflectance, and the films from comparative examples 2 and 3 did not have enough folding endurance.

On the other hand, the antireflective film obtained from embodiment 1 had the folding endurance similar to the single PET film (comparative example 1) and could improve the scratch resistance and decrease the reflectance.

Moreover, when a flexible display device was manufactured using the antireflective film obtained from embodiment 1, the external light was prevented from being reflected, and clear images could be displayed.

According to the present invention, a flexible display device that includes an antireflective film increasing productivity at low costs and having superior folding endurance, scratch resistance and transparency can be provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed:

1. A flexible display device comprising:
an antireflective film on an image display surface of the flexible display device, wherein the antireflective film includes an antireflective layer having a refractive index of less than 1.45 disposed directly on at least one surface of a transparent resin film having flexibility,
wherein the antireflective layer includes inorganic particles within a matrix resin of one of a thermosetting resin and an UV curable resin,
wherein the matrix resin completely fills a plurality of voids located between the inorganic particles,
wherein a volumetric ratio of the inorganic particles in the antireflective layer is equal to or larger than 40 vol %,
wherein a diameter of each of the inorganic particles is within a range of 5 to 200 nm, wherein a thickness of the antireflective layer is within a range of 50 to 200 nm,
wherein the inorganic particles are layered as two layers or more in a thickness direction of the antireflective layer,
wherein the inorganic particles are hollow silica particles, and
wherein the antireflective film has a reflectance of 5% to 6% and a total light transmittance of 88% to 91%.

2. The flexible display device according to claim 1, wherein the antireflective layer of the antireflective film has hardness equal to or more than H in a pencil hardness test (weight 1000 g) based on JIS K 5600-5-4.

3. The flexible display device according to claim 1, wherein the antireflective layer is formed by a coating method.

4. The flexible display device according to claim 1, wherein the inorganic particles further comprise alumina or zinc oxide particles.

5. The flexible display device according to claim 1, wherein there is no crack when a bending test of the antireflective film is performed based on JIS K 5600-5-1 and using a cylindrical mandrel with a diameter of 2 mm.

* * * * *